US010069300B2

(12) United States Patent
Lenox (10) Patent No.: US 10,069,300 B2
(45) Date of Patent: Sep. 4, 2018

(54) METHODS AND APPARATUS FOR DISPATCHING ELECTRICAL ENERGY FROM DISTRIBUTED ENERGY RESOURCES

(75) Inventor: Carl J. S. Lenox, Oakland, CA (US)

(73) Assignee: SunPower Corporation, San Jose, CA (US)

( * ) Notice: Subject to any disclaimer, the term of this patent is extended or adjusted under 35 U.S.C. 154(b) by 1790 days.

(21) Appl. No.: 13/420,376

(22) Filed: Mar. 14, 2012

(65) Prior Publication Data

US 2013/0190939 A1 Jul. 25, 2013

Related U.S. Application Data

(60) Provisional application No. 61/589,158, filed on Jan. 20, 2012.

(51) Int. Cl.
*H02J 3/32* (2006.01)
*H02J 3/38* (2006.01)
*H02J 3/14* (2006.01)

(52) U.S. Cl.
CPC ............... *H02J 3/32* (2013.01); *H02J 3/383* (2013.01); *H02J 3/14* (2013.01); *H02J 2003/146* (2013.01); *Y02E 10/563* (2013.01); *Y02E 10/566* (2013.01); *Y02E 70/30* (2013.01); *Y04S 20/224* (2013.01)

(58) Field of Classification Search
USPC ............... 700/297, 298, 286, 291, 295, 296; 307/45, 125, 80, 84, 69, 65, 19
See application file for complete search history.

(56) References Cited

U.S. PATENT DOCUMENTS

| 4,971,136 | A | * | 11/1990 | Mathur et al. | ................ | 165/240 |
|---|---|---|---|---|---|---|
| 6,037,758 | A | | 3/2000 | Perez | | |
| 6,510,369 | B1 | * | 1/2003 | Lacy | ............................ | 700/295 |
| 6,542,791 | B1 | | 4/2003 | Perez | | |
| 6,889,122 | B2 | | 5/2005 | Perez | | |
| 7,274,975 | B2 | * | 9/2007 | Miller | .................... | G06Q 50/06 |
| | | | | | | 700/295 |
| 2009/0157529 | A1 | | 6/2009 | Ehlers et al. | | |
| 2009/0319090 | A1 | | 12/2009 | Dillon et al. | | |
| 2010/0070099 | A1 | | 3/2010 | Watson et al. | | |
| 2010/0211233 | A1 | * | 8/2010 | Roscoe et al. | ................ | 700/296 |
| 2011/0040420 | A1 | | 2/2011 | Lenox | | |
| 2011/0140648 | A1 | * | 6/2011 | Lee | ............................... | 320/101 |
| 2011/0218691 | A1 | * | 9/2011 | O'Callaghan | ........... | G06Q 10/06 |
| | | | | | | 700/296 |
| 2012/0245744 | A1 | * | 9/2012 | Prosser | ..................... | H02J 3/46 |
| | | | | | | 700/286 |

(Continued)

OTHER PUBLICATIONS

PCT International Search Report and Written Opinion of the International Searching Authority for Application No. PCT/US2012/068981, Feb. 25, 2013, 8 sheets.

*Primary Examiner* — Robert E Fennema
*Assistant Examiner* — Marzia T Monty
(74) *Attorney, Agent, or Firm* — Okamoto & Benedicto LLP (57) ABSTRACT

Demand of a facility load for electrical energy is monitored and compared to a demand cap for a demand period. A demand cap may be set for peak periods, another demand cap may be set for part-peak periods, and yet another demand cap may be set for off-peak periods. Dispatch of electrical energy from the energy storage system is based on the demand of the facility load relative to the demand cap.

11 Claims, 7 Drawing Sheets

(56) References Cited

U.S. PATENT DOCUMENTS

2012/0256478 A1* 10/2012 Druckenmueller ............ 303/10
2013/0030590 A1*  1/2013 Prosser .................... H02J 3/14
                                                           700/295
2013/0270911 A1* 10/2013 Baba et al. .................... 307/65

* cited by examiner

METHODS AND APPARATUS FOR DISPATCHING ELECTRICAL ENERGY FROM DISTRIBUTED ENERGY RESOURCES

CROSS-REFERENCE TO RELATED APPLICATION

This application claims the benefit of U.S. Provisional Application No. 61/589,158, filed on Jan. 20, 2012, which is incorporated herein by reference in its entirety.

TECHNICAL FIELD

Embodiments of the subject matter described herein relate generally to photovoltaic systems. More particularly, embodiments of the subject matter relate to dispatching electrical energy from distributed energy resources.

BACKGROUND

Electricity providers, which are also referred to as "electric utilities," charge their customers not just based on the amount of electrical energy consumed but also the time period when the electrical energy is consumed and the average power demand level of that energy consumption over specified time intervals. More particularly, an electric utility may impose a demand charge, which is a surcharge on electrical power demand during particular time periods. Although photovoltaic systems may be employed to reduce electric utility bills, limited work has been done to determine how best to dispatch stored electrical energy over extended periods of time in order to reduce demand charges.

BRIEF SUMMARY

In one embodiment, a method of dispatching electrical energy from an energy storage system includes monitoring electrical energy demand of a facility load. A demand cap is set for a demand period. The electrical energy demand of the facility load is compared against the demand cap during the demand period. In response to determining that the electrical energy demand of the facility load is expected to be less than the demand cap, it is determined whether an energy storage system can dispatch electrical energy at a discharge limit for a duration longer than a remaining time in the demand period. In response to determining that the energy storage system can dispatch electrical energy at the discharge limit for the duration longer than the remaining time in the demand period, electrical energy is discharged from the energy storage system at the discharge limit.

In another embodiment, a power generation system comprises an energy storage system, a photovoltaic system coupled to provide electrical energy to a facility load, and a control system configured to control discharge of electrical energy from the energy storage system to the facility load, the control system being configured to monitor demand of the facility load for electrical energy, to compare the demand of the facility load against a demand cap for a demand period, and to discharge electrical energy from the energy storage system at a discharge rate based on a comparison of the demand of the facility load for electrical energy and the demand cap.

In another embodiment, a method of dispatching electrical energy from an energy storage system includes monitoring demand of a facility load for electrical energy. A first demand of the facility load for electrical energy is compared against a first demand cap during a first demand period. It is determined that the first demand of the facility load for electrical energy is expected to be greater than the first demand cap. In response to determining that the first demand of the facility load for electrical energy is expected to be greater than the first demand cap, electrical energy is discharged from an energy storage system to the facility load at a first output power. It is determined that the first demand of the facility load for electrical energy is not expected to be greater than the first demand cap. In response to determining that the first demand of the facility load for electrical energy is not expected to be greater than the first demand cap, the energy storage system is charged with electrical energy at a first input power.

These and other features of the present invention will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
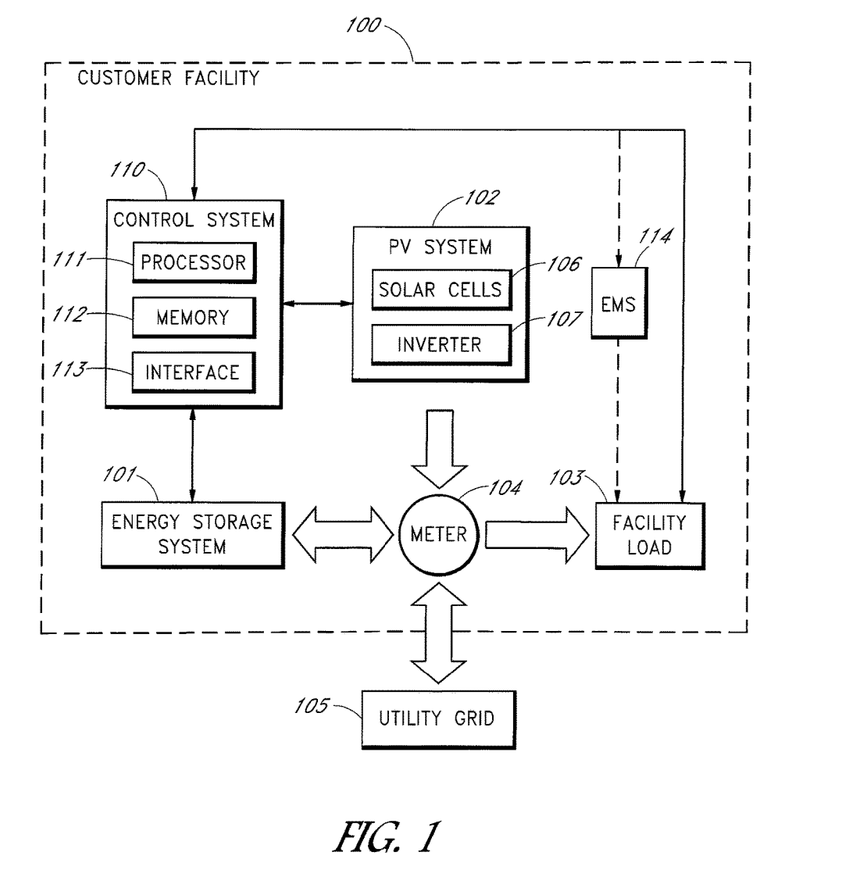
FIG. 1 shows a schematic diagram of a power generation system in accordance with an embodiment of the present invention.

FIG. 1 shows a schematic diagram of a power generation system in accordance with an embodiment of the present invention. In the example of FIG. 1, the power generation system includes an energy storage system 101, a photovoltaic system 102, a facility load 103, a utility grid 105, and a control system 110. The control system 110 is configured to control electrical energy dispatch from the energy storage system 101 or other distributed energy resource. In the example of FIG. 1, the control system 110 is deployed in a customer facility 100. The customer facility 100 may be a commercial, government, or residential facility, for example. The customer facility 100 may optionally include a facility energy management system (EMS) 114 configured to control the facility load 103.

In the example of FIG. 1, the customer facility 100 includes the photovoltaic system 102 for generating electrical energy from solar radiation. The photovoltaic system 102 may comprise, among other components, a plurality of solar cells 106 and a photovoltaic inverter 107. The solar cells 106 convert solar radiation into electrical energy. The solar cells 106 may be commercially available solar cells, such as those from the SunPower™ Corporation of San Jose Calif. The photovoltaic inverter 107 converts direct current (DC) generated by the solar cells 106 into alternating current (AC) suitable for consumption by the facility load 103, which may comprise appliances, machinery, lighting, and other devices that consume electrical energy. The photovoltaic system 102 may have a plurality of inverters 107 but only one is shown in FIG. 1 for clarity of illustration. The photovoltaic system 102 may be electrically coupled to a point of interconnect (POI), which in the example of FIG. 1 comprises an electric utility meter 104.

The facility load 103 may consume electrical energy provided by the utility grid 105 of the electric utility, the photovoltaic system 102, and the energy storage system 101. The control system 110 may send a control signal to the energy storage system 101 to command the energy storage system 101 to dispatch electrical energy by discharging to the facility load 103, or to command the energy storage system 101 to charge using electrical energy from the utility grid 105 or the photovoltaic system 102. The photovoltaic system 102 may optionally have a direct connection to the energy storage system 101. In the embodiment of FIG. 1, the control system 110 may directly receive data from and send commands to the facility load 103. In other embodiments, the control system 110 may receive data from and send commands to the facility load 103 by way of the EMS 114.

The energy storage system 101 may comprise an electrical energy storage device or an electrical energy generating device. In the embodiment of FIG. 1, the energy storage system 101 comprises a battery and associated control modules. In general, the energy storage system 101 may comprise one or more electrochemical (e.g. battery), electrical (e.g. capacitor, SMES), mechanical (e.g. flywheel, gravitational, compressed air), thermal (e.g. chilled water, steam, building mass), and/or chemical (e.g. natural gas, hydrogen, diesel) energy storage devices. Furthermore, in other embodiments, the functionality of the energy storage system 101 may be satisfied by other distributed energy resources, such as responsive loads, fuel cells, micro-turbines, internal combustion engines, etc. In these other embodiments, the main difference would be specific operational constraints impacting available discharge or charge electrical power. Desired discharge or charge electrical power may also have to be converted into different signals (e.g. changing thermostats to a cooler setpoint as a proxy for charge power).

In the example of FIG. 1, the control system 110 includes a processor 111 (e.g., microprocessor or central processing unit), memory 112 (e.g., random access memory, data storage devices), and interfaces 113. The control system 110 may perform steps of a method by having corresponding computer-readable program code stored in the memory 112 executed by the processor 111. The control system of the control system 110 may also have hardware or software based operational logic, such as proportional-integral-derivative (PID) controllers, to perform control functions.

The interfaces 113 allow the control system 110 to communicate with the energy storage system 101, the photovoltaic system 102, and the facility load 103 (e.g., by way of the EMS 114). The interfaces 113 may comprise a computer network interface, signal cables, wireless communication interface, and/or other means for device communication. The functionality of the control system 110 may be distributed among one or more devices depending on implementation. The functionality of the control system 110 may also be incorporated in the energy storage system 101, the photovoltaic system 102, or the EMS 114.

The control system 110 may be configured to control dispatch of electrical energy from the energy storage system 101. In one embodiment, the control system 110 is configured to reduce demand charges and maximize the amount of electrical energy that is shifted from one time period to another. For example, the control system 110 may be configured to operate in arbitrage mode to dispatch most of the electrical energy from the energy storage system 101 during peak periods, when the demand charge is highest.

An electric utility company may impose different demand charges for electrical energy consumed based on the billing period, time of use, and interval. A "billing period" is the time span over which a billed parameter is determined. For example, demand charges are often assessed based on a monthly billing period. The billing period may also be annual. Rates also often vary by billing period. For example, summer rates are typically higher than winter rates.

A "time of use (TOU) period" is a time period over which differential rates (demand and/or energy) are applied. A TOU period may vary by billing period. An example summer peak TOU period is noon to 6:00 PM weekdays, excluding holidays, May-October. There are often several TOU periods defined (e.g. peak, part-peak, off-peak) all with different rates. For example, a winter part-peak period (November-April billing period) is defined over a different time span and has different rates from a summer part-peak period. Some rate structures have TOU periods within the billing period only for energy and not demand, or vice versa.

An "interval" is the smallest increment of time over which billed energy or demand is determined. An example interval for demand charges is 15 minutes. In that example, a demand charge for a specific TOU period within a billing period is based on the maximum average demand in a given 15 minute interval for those periods.

The control system 110 may be configured to dispatch electrical energy from the energy storage system 101 to meet a demand cap for a particular billing period, TOU period, and interval. A demand cap may have a level expressed in units of electrical power, e.g., kilowatts (kW). A demand cap may serve as a reference level for comparison with the demand of the facility load 103 for electrical energy. When the demand of the facility load 103 approaches the demand cap, the control system 110 may be configured to discharge sufficient electrical energy from the energy storage system 101 such that the demand of the facility load 103 is at the same level as the demand cap. When the demand of the facility load 103 is less than the demand cap, the control system 110 may be configured to discharge electrical energy from the energy storage system 101 at a discharge limit until the end of the demand period depending on the amount of electrical energy stored in the energy storage system 101 and the time remaining in the demand period. The discharge limit may be at full power, for example.

In one embodiment, the control system 110 is configured to meet a target peak demand cap during peak periods. The peak demand cap may be based on historical load, photovoltaic production, and projections for the future value of these aforementioned quantities. The peak demand cap may be based on the maximum expected net demand of the facility load 103 minus the power rating of the energy storage system 101 and controllable loads of the facility 100. The net demand of the facility load 103 may be the energy demand of the facility load 103 minus the output of the photovoltaic system 102 for each 15 minute interval. The photovoltaic system 102 and the energy storage system 101 are then operated to maintain the target peak demand cap.

If, in the course of operation, maintaining the target peak demand cap is projected to be not feasible given the limited energy on board for a given day, the peak demand cap may be reset based on the projection. This would result in running the energy storage system 101 for a longer time, at lower power, to reduce demand a smaller amount rather than running out of electrical energy near the end of the demand period (when net demand is typically highest), and therefore not impacting the demand charge. The energy storage system 101 may also interact with controllable loads or demand resources used primarily as a source of contingency or backup reserves to backstop any shortfall in system energy due to underestimating the need for storage duration during the planning stage.

The specific power/duration curve for demand resources is typically facility specific based on the equipment, thermal mass of the building, and comfort requirements. Generally, the amount of load that can be deferred in a facility decreases as a function of the duration of the deferral, so it is most appropriately used to manage relatively short term shortfalls (e.g., one hour or less) of energy storage. On any given day, if excess energy is available in the energy storage system 101, the excess energy may be dispatched such that all remaining usable energy, such as in the energy storage system 101, is used in an arbitrage mode. This may be achieved by monitoring the amount of energy in the energy storage system 101 and dispatching it at full power once the amount of time in the peak demand period is less than or equal to the remaining discharge duration of the energy storage system 101 at full power. Recharging the energy storage system 101 may also be limited to avoid increasing off-peak demand charges. This may be accomplished by capping the maximum recharge demand and/or timing the recharge to coincide with low load overnight hours.

Figure 2:
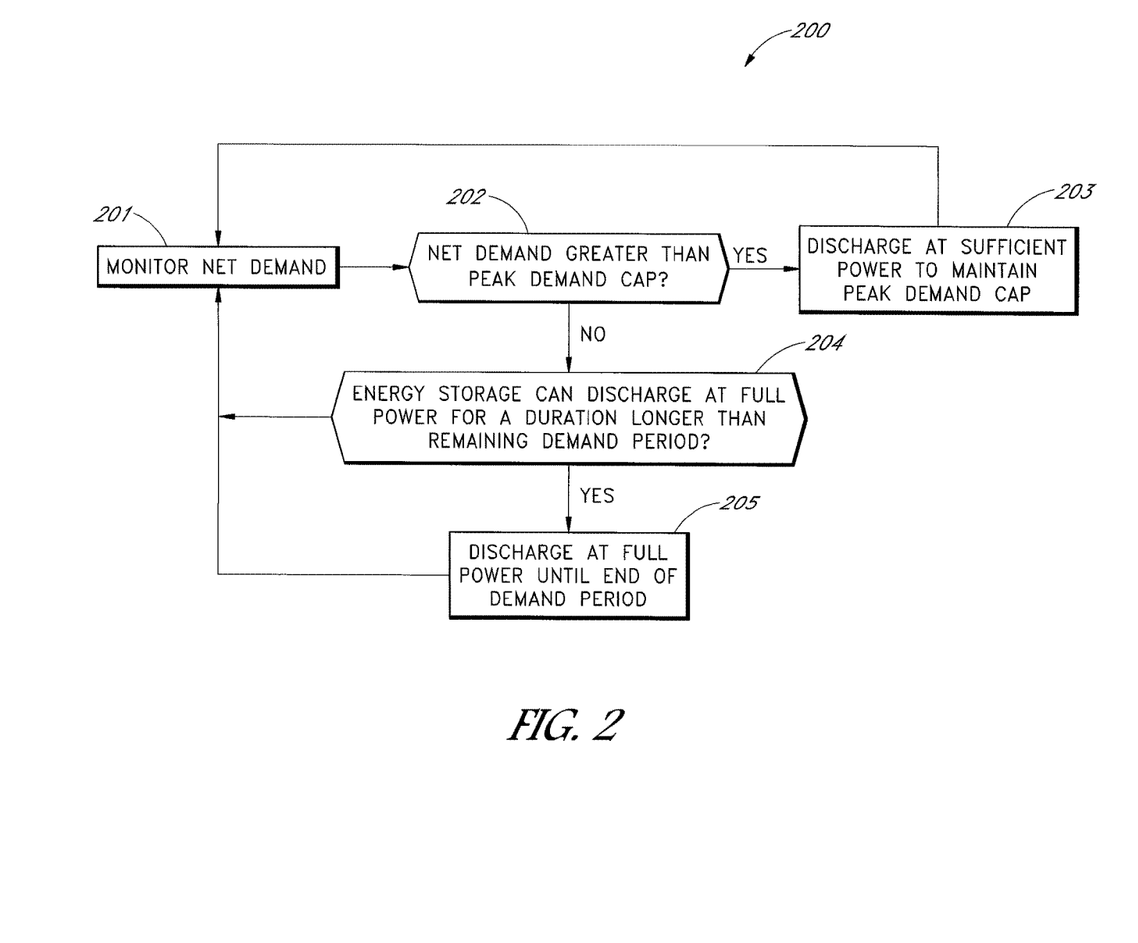
FIG. 2 shows a flow diagram of a method of dispatching electrical energy from an energy storage system in accordance with an embodiment of the present invention.

FIG. 2 shows a flow diagram of a method 200 of dispatching electrical energy from the energy storage system 101 in accordance with an embodiment of the present invention. The method 200 is explained with reference to the components shown in FIG. 1 for illustration purposes only.

In the example of FIG. 2, the method 200 includes the control system 110 monitoring the net demand of the facility load 103 (step 201). In one embodiment, the net demand is the amount of electrical energy demanded by the facility load 103 minus the output of the photovoltaic system 102. In this example, the net demand is the process variable compared against the demand cap to determine how the energy storage system 101 should behave. Like a demand cap, the net demand may also be expressed in units of electrical power, which in this case is in kW.

The control system 110 compares the net demand to the peak demand cap (step 202). When the net demand is expected to exceed the peak demand cap (e.g., based on current trend of the net demand), the control system 110 commands the energy storage system 101 to discharge sufficient power that is less than or equal to full power to maintain the peak demand cap (step 203). That is, when the net demand is greater than the peak demand cap, the energy storage system 101 is commanded to dispatch enough electrical power to cover the difference between the net demand and the peak demand cap. As a particular example, when the net demand is 5000 kW and the peak demand cap is 4000 kW, the control system 110 may command the energy storage system 101 to discharge the difference between the levels of the net demand and the peak demand cap, which in this particular example is 1000 kW.

When the net demand is not expected to be greater than the peak demand cap, the control system 110 determines whether the energy storage system 101 can discharge at full power for a duration longer than the remaining time in the demand period (step 204). "Full power" is the most the energy storage system 101 can discharge at the time, and may be at 100% power rating of the energy storage system 101. If the energy storage system 101 has enough stored electrical energy to discharge at full power for a duration equal to or longer than the time remaining in the demand period, the control system 110 commands the energy storage system 101 to discharge at full power until the end of the demand period (step 204 to step 205). Otherwise, the control system 110 commands the energy storage system 101 to continue monitoring the net demand of the facility load 103 (step 204 to step 201).

As can be appreciated, the level of the peak demand cap may be dynamically varied during operation of the method 200 when projection based on monitored net demand and the charge remaining on the energy storage system 101 indicate that it will not be possible to meet the peak demand cap. In that case, the peak demand cap may be ratcheted up, i.e., increased, to meet the projection. The method 200 may also incorporate dispatching electrical energy from demand-side resources other than the energy storage system 101 to meet the peak demand cap.

Figure 3:
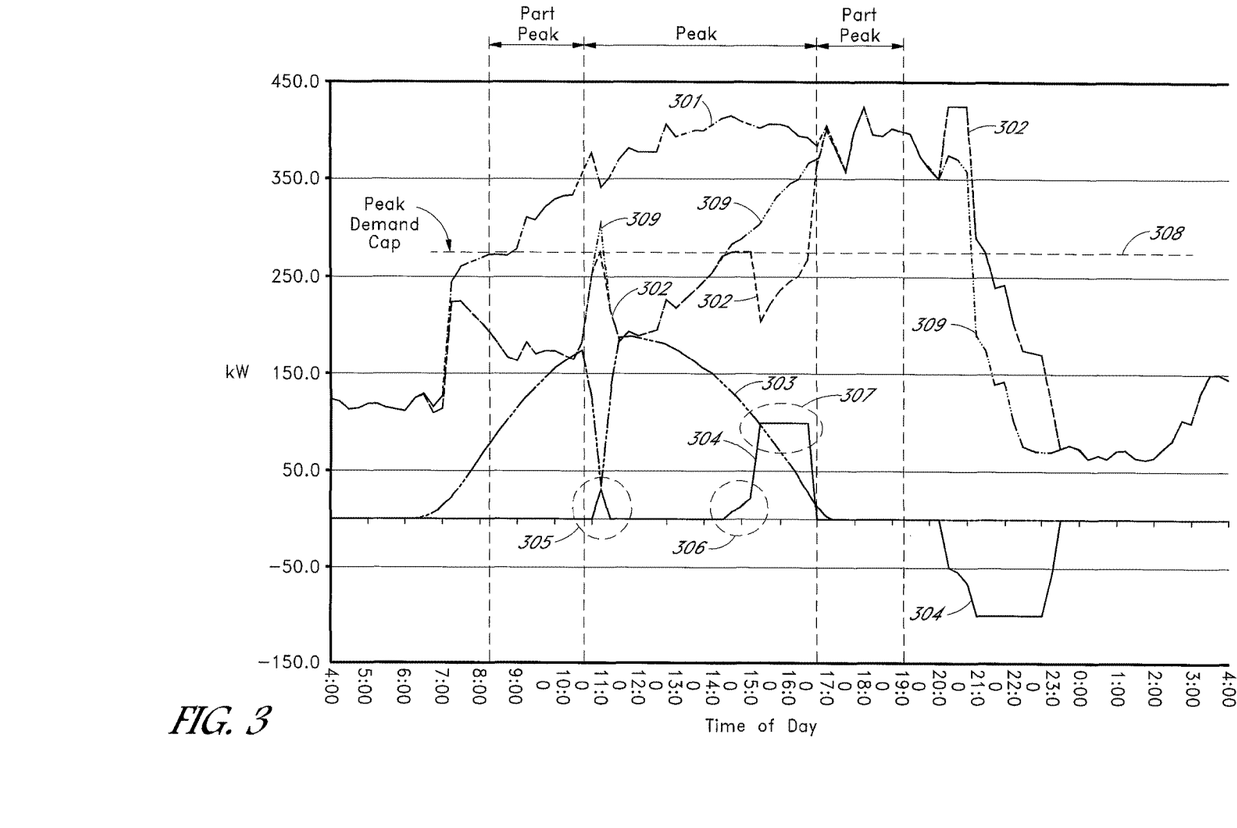
FIG. 3 shows example plots that result from operation of the method of FIG. 2, in accordance with an embodiment of the present invention.

FIG. 3 show example plots that result from operation of the method 200 in a typical summer day, in accordance with an embodiment of the present invention. In the example of FIG. 3, the vertical axis indicates electrical power in kW (kilowatts) and the horizontal axis indicates the time of day. The hours for the peak and part-peak demand periods are noted in FIG. 3.

FIG. 3 shows a plot 301 of gross demand of the facility load 103, a plot 302 of controlled demand of the facility load 103, a plot 303 of the output of the photovoltaic system 102, a plot 304 of the dispatch of the energy storage system 101, and a plot 309 of net demand of the facility load 103. A positive value of the plot 304 indicates the energy storage system 101 discharging electrical energy to the facility load 103, and a negative value indicates the energy storage system 101 being charged by the utility grid 105.

The plot 302 of controlled demand is the gross demand of the facility load 103 minus the output of the photovoltaic system 102 and the output or input of the energy storage system 101. When the net demand (plot 309) rises to exceed the peak demand cap (see 308), the control system 110 commands the energy storage system 101 to discharge sufficient electrical energy; at up to full power, to the facility load 103 (see 305 and 306) to meet the peak demand cap as in step 203 of the method 200 (see FIG. 2). This results in the plot 302 of controlled demand not exceeding the peak demand cap. If the energy storage system 101 has enough energy to discharge electrical energy at full power for a duration equal to or longer than the remaining time in the peak demand period, the control system 110 commands the energy storage system 101 to discharge electrical energy at full power (see 307) for the remaining time of the demand period, i.e., until end of the peak demand period, as in step 205 of the method 200.

While the demand cap approach described above is only applied for one period of one season, i.e., during summer peak periods, the demand cap approach may be applied across different periods of different seasons. By optimally allocating the available dispatch energy across the different periods, substantially better results may be obtained compared to simply using the demand cap approach only for the peak periods. For example, different demand caps may be set for different periods by setting a separate demand cap for peak periods, a separate demand cap for part-peak periods, and a separate demand cap for off-peak periods. The periods may also be further optimized by season, such as a separate demand cap for summer peak periods, a separate demand cap for winter peak periods, etc. By combining a forecast of net demand with demand cap allocation, the risk of underperformance due to changes in the solar resource and underlying facility load can be lessened, leading to higher value.

A modeling investigation was undertaken by the inventor to understand how the value of energy storage systems changes as the net load against which it is dispatched changes, especially given that once the system is installed those parameters (kW and kWh) are relatively fixed. Essentially, what is determined is, first, what is the maximum value that can be extracted given a scenario where the net load is known a priori. With this baseline established, one can then determine the impacts of both changes in the net load shape and error in predicting the net load shape. In the course of exploring these relationships, the inventor determined that an approach that allowed electrical energy from the energy storage system to be dispatched to control demand during any demand period (e.g., not only summer peak demand periods) is most optimal. This is contrary to previous findings that are based on investigating other, more simple approaches, which showed that significant additional duration had to be added to address part-peak and off-peak demand charges, with a poor cost/benefit ratio. The demand cap approach disclosed herein allows for shorter duration storage to be selectively dispatched during non-summer peak periods. The demand cap approach also allows non-peak demand charges to be reduced, resulting in significant additional value. Because the demand cap approach allows the storage to recharge if net load is below the demand cap, this allows relatively short duration storage to extend load leveling late into the day while serving peak loads. It also allows the storage to be set to achieve longer duration (at lower than maximum power output) to cover both part-peak and off-peak demand in the winter months.

Specifically, tuning the demand cap levels for different periods, and especially for the part-peak periods, can provide significant benefits. The demand cap approach may estimate the maximum demand in each period for each month, and then set the maximum demand for each period at that level less the power rating of the energy storage device. Tuning these demand cap levels simply means that for a given demand period, the energy storage system is restricted to output less than 100% of its power rating. This effectively extends the available duration of the energy storage system during this period. Reducing the part-peak periods dispatch level is particularly effective because it allows all hours demand charge, where applicable, to be reduced. Properly tuning the demand cap levels is also effective in reducing the negative impacts of changes in the net load shape from year to year.

Figure 4:
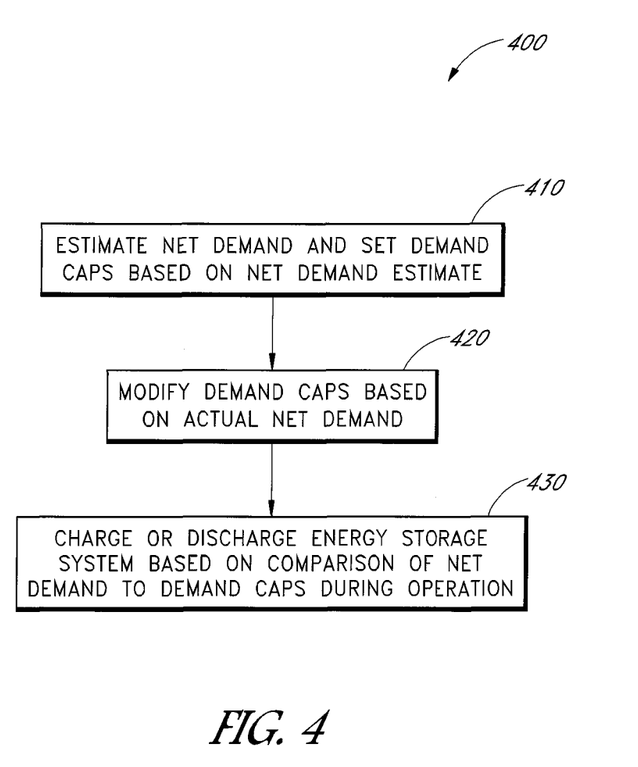
FIG. 4 shows a flow diagram of a method of dispatching electrical energy from an energy storage system in accordance with an embodiment of the present invention.

FIG. 4 shows a flow diagram of a method 400 of dispatching electrical energy from an energy storage system in accordance with an embodiment of the present invention. The method 400 may be performed by the control system 110 to dispatch electrical energy from the energy storage system 101. In the example of FIG. 4, the method 400 comprises the steps 410, 420, and 430. Each of these steps is further explained with reference to FIGS. 5, 6, and 7. The methods of FIGS. 4-7 are explained with reference to the components shown in FIG. 1 for illustration purposes only.

In the example of FIG. 4, the method 400 includes a step to estimate net demand and to set demand caps based on the estimated net demand (step 410). This step may be performed offline at the planning stage and periodically during the operation of the system, based on recent historical data. The net demand of the facility load 103 is monitored, and the demand caps are modified in real time (i.e., during operation of the power generation system) based on the actual net demand of the facility load 103 (step 420). In one embodiment, the net demand of the facility load 103 is the amount of electrical energy demanded by the facility load 103 minus the output of the photovoltaic system 102. The energy storage system 101 is charged and discharged based on a comparison of the net demand of the facility load 103 to the demand caps (step 430). Steps 420 and 430 are performed for each interval of the demand period.

Figure 5:
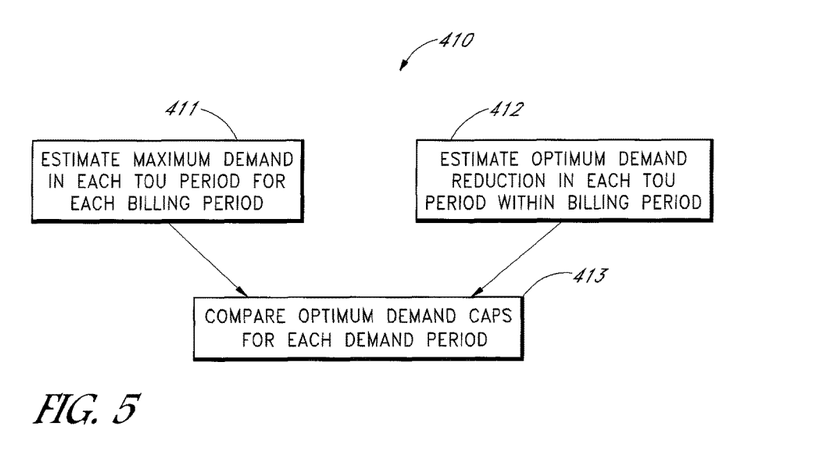
FIG. 5 shows a flow diagram of a method of estimating net demand and setting demand caps based on the estimated net demand in accordance with an embodiment of the present invention.

FIG. 5 shows a flow diagram of a method of estimating net demand and setting demand caps based on the estimated net demand in accordance with an embodiment of the present invention. The method of FIG. 5 is a particular embodiment of the step 410 of the method 400 (see FIG. 4). The method of FIG. 5 is performed offline during the planning stage and periodically during the operation of the system, based on recent historical data.

In the example of FIG. 5, the maximum demand in each TOU period for each billing period is estimated (step 411). As a particular example, demand charge may be billed on a monthly billing period based on a peak period demand charge, a part-peak period demand charge, and an all hours demand charge. The maximum demand charge in each TOU period (e.g., peak, part-peak, off peak or all hours) for the month may be estimated based on historical conditions & forecast of weather and/or demand. Estimating the maximum demand charge in each TOU period for the following month may be performed at the end of the current month.

In the example of FIG. 5, the optimum demand reduction in each TOU period within the billing period is estimated (step 412). The optimized demand reduction sets the maximum demand reduction in each demand period as a percentage that is less than or equal to 100% of the power rating of the energy storage system 101. The optimized demand reduction may be based on an economic optimization using historical data. The optimized demand reduction may be set for an entire year, or may be based on a previous month, or another time period of interest.

The optimum demand caps for each period may be computed (step 413) based on the estimated maximum demand in each TOU period for each billing period and the estimated optimum demand reduction in each TOU period within a billing period. For example, the optimum demand cap may be the estimated maximum demand minus the optimum demand reduction. The optimum demand caps are subsequently used as demand caps during operation of the power generation system as in the method of FIG. 7. The optimum demand caps may be dynamically adjusted during operation of the power generation system as explained with reference to FIG. 6.

Figure 6:
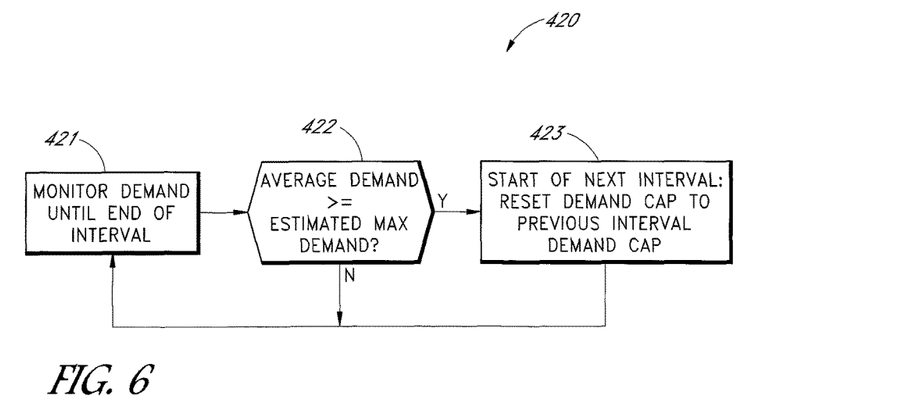
FIG. 6 shows a flow diagram of a method of modifying demand caps in accordance with an embodiment of the present invention.

FIG. 6 shows a flow diagram of a method of modifying demand caps in accordance with an embodiment of the present invention. The method of FIG. 6 is a particular embodiment of the step 420 of the method 400 (see FIG. 4). The method of FIG. 6 is performed in real time, i.e., during normal operation of the power generation system, for each interval of the demand period. The method of FIG. 6 advantageously allows for dynamic adjustment of demand caps to adapt to changing load conditions.

In the example of FIG. 6, the net demand of the facility load 103 is monitored until the end of the interval (step 421). The average of the net demand of the facility load 103 is compared against the demand cap (step 422), which was computed previously (see step 413 of FIG. 5). If the average of the net demand of the facility load 103 is greater than or equal to the estimated maximum demand, the control system 110 resets the estimated maximum demand to a same level as the actual net demand of the immediately preceding interval (step 422 to step 423) and recalculates the demand cap by subtracting the optimum demand reduction from the new estimated maximum demand. Otherwise, if the average of the net demand of the facility load 103 is less than the estimated maximum demand, the control system 110 simply continues monitoring of the net demand of the facility load 103 until the end of the interval (step 422 to step 421).

Figure 7:
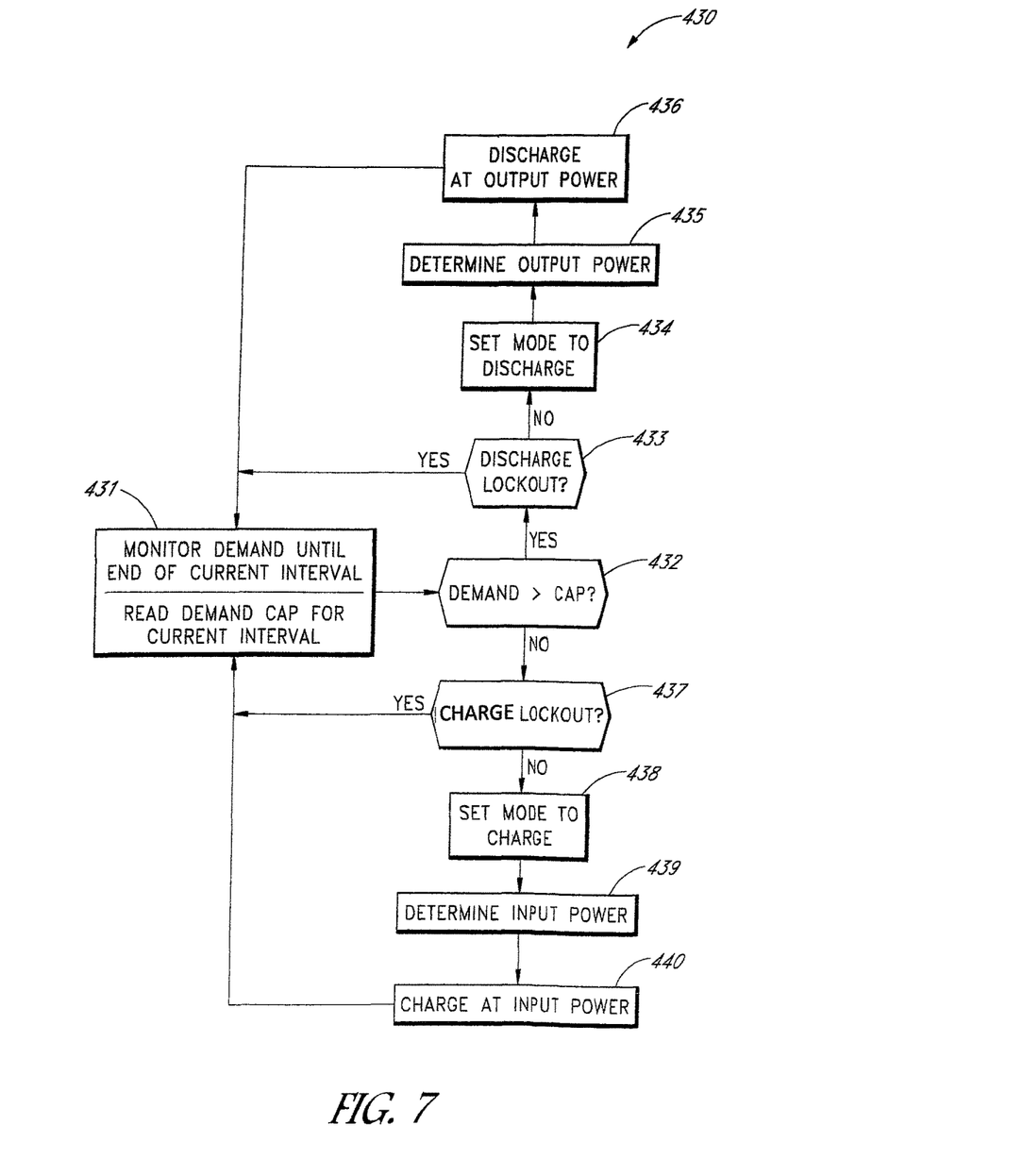
FIG. 7 shows a flow diagram of a method of charging and discharging an energy storage system in accordance with an embodiment of the present invention.

FIG. 7 shows a flow diagram of a method of charging and discharging an energy storage system in accordance with an embodiment of the present invention. The method of FIG. 7 is a particular embodiment of the step 430 of the method 400 (see FIG. 4). The method of FIG. 7 together with the method of FIG. 6 are performed in real time, i.e., during normal operation of the power generation system, for each interval of the demand period.

In the example of FIG. 7, the control system 110 reads the demand cap for the current interval and monitors the net demand of the facility load 103 until end of the current interval (step 431). The demand cap for the current interval may be stored in a register, in a table, or as a variable, for example, after offline computation either during the planning stage or periodically during operation (see step 413 of FIG. 5), or after adjustment in real time as discussed with reference to FIG. 6 (see step 423 of FIG. 6). The control system 110 may select the demand cap for the current interval based on the current time and date. The control system 110 then compares the net demand of the facility load 103 to the demand cap (step 432).

When the net demand of the facility load 103 is expected to be greater than the demand cap (e.g., based on the current trend of the net demand), the control system 110 checks to see if a discharge lockout is in place (step 432 to step 433). Charging or discharging of the energy storage system 101 may be prohibited based on one or more criteria, such as the TOU period, state of charge of the energy storage system 101, time remaining in the demand period, etc., depending on implementation. When a discharge lockout is in place, i.e. discharging is prohibited, the control system 110 does not perform a discharge of the energy storage system 101. Instead, the control system 110 simply continues monitoring of the net demand of the facility load 103 (step 433 to step 431). Otherwise, when a discharge lockout is not in place, the control system 110 sets the energy storage system 101 to discharge mode (step 433 to step 434). The control system 110 determines the output power to be discharged by the energy storage system 101 (step 435). In one embodiment, the control system 110 determines the output power to be discharged by the energy storage system 101 based on the least of:

a) Commanded power=Net demand of the facility load 103 minus the demand cap
b) Power limit (optimum demand reduction)
c) Energy limit (power at which the state of usable charge of the energy storage system 101 is equal to 0% at end of interval)

The state of usable charge (SOUC) of the energy storage system 101 is the percent of usable electrical energy remaining in the energy storage system 101 based on the desired depth of cycling range. The control system 110 may also determine the output power to be discharged by the energy storage system 101 using other factors or methodology without detracting from the merits of the present invention.

The control system 110 commands the energy storage system 101 to discharge at the output power (step 436), and continues monitoring of the net demand of the facility load 103 (step 436 to step 431).

When the net demand of the facility load 103 is not expected to be greater than the demand cap, the control system 110 checks to see if a charge lockout is in place (step 432 to step 437). When a charge lockout is in place, i.e. charging is prohibited, the control system 110 does not perform charging of the energy storage system 101 and simply continues monitoring of the net demand of the facility load 103 (step 437 to step 431). Otherwise, when a charge lockout is not in place, the control system 110 sets the energy storage system 101 to charge mode (step 437 to step 438). The control system 110 determines the input power to charge the energy storage system 101 (step 439). In one embodiment, the control system 110 determines the input power to charge the energy storage system 101 based on the least of:

a) Commanded power=The demand cap minus net demand of the facility load 103
b) Power limit (energy storage system nameplate charging power 101 in kW)
c) Energy limit (power at which the SOUC of the energy storage system 101 is equal to 100% at end of interval)

The control system 110 may also determine the input power to charge the energy storage system 101 using other factors or methodology without detracting from the merits of the present invention.

The control system 110 commands the energy storage system 101 to charge at the input power (step 440). In one embodiment, the energy storage system 101 is charged using electrical energy from the utility grid 105. The control system 110 then continues monitoring of the net demand of the facility load 103 (step 440 to step 431).

Figure 8:
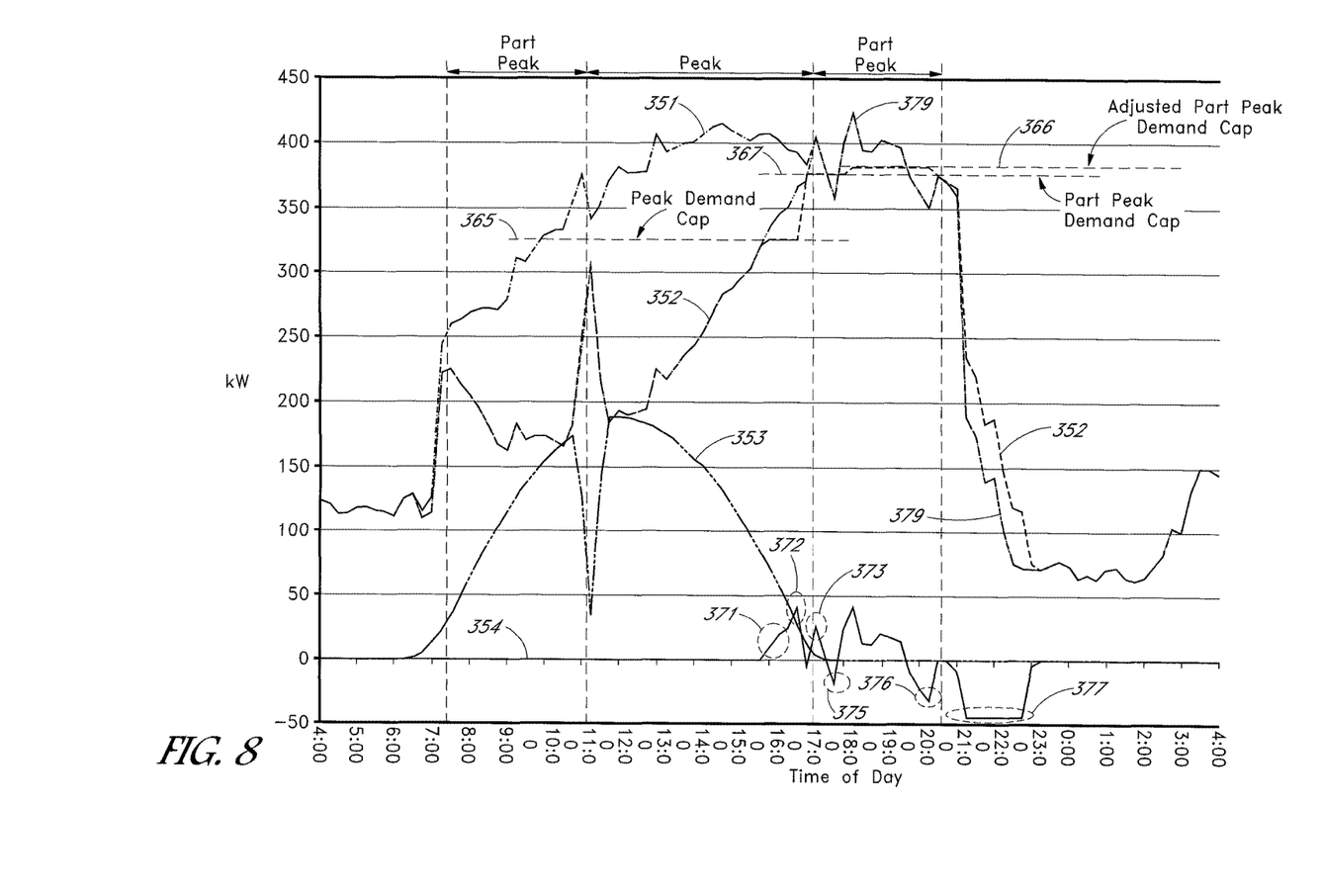
FIG. 8 show example plots that result from operation of the methods of FIGS. 4-7 in accordance with an embodiment of the present invention

FIG. 8 show example plots that result from operation of the methods of FIGS. 4-7 in accordance with an embodiment of the present invention. In the example of FIG. 8, the vertical axis indicates electrical power in kW and the horizontal axis indicates the time of day. The hours for peak and part-peak demand periods are noted in FIG. 8. The off-peak demand period occurs during hours outside the peak and part-peak demand periods.

FIG. 8 shows a plot 351 of gross demand of the facility load 103, a plot 352 of controlled demand of the facility load 103, a plot 353 of the output of the photovoltaic system 102, a plot 354 of the charge and discharge of the energy storage system 101, and a plot 379 of net demand of the facility load 103. The plot 352 of controlled demand is the gross demand of the facility load 103 minus the output of the photovoltaic system 102 and the energy storage system 101. When the net demand (plot 379) rises to exceed the peak demand cap (see 365) during the peak demand period, the control system 110 commands the energy storage system 101 to discharge sufficient electrical power to meet the peak demand cap (see 371 and 372) as in step 430 of FIG. 4, and in further detail as in steps 438-440 of FIG. 7. This results in the plot 352 of controlled demand not exceeding the peak demand cap.

Similarly, when the net demand (plot 379) rises to exceed the part-peak demand cap (see 367) during the part-peak demand period, the control system 110 commands the energy storage system 101 to discharge sufficient electrical power to meet the part-peak demand cap (see 373) as in step 430 of the method 400, and in further detail as in steps 438-440 of FIG. 7. At some point during the part-peak demand period, the average net demand is greater than the estimated maximum part-peak demand. In response, the control system 110 dynamically increases the estimated maximum part-peak demand to a higher level as in the step 420 of FIG. 4, and in further detail as in the steps 421-423 of FIG. 6, thereby resulting in the adjusted part-peak demand cap (see 366).

In the example of FIG. 8, a negative value of the plot 354 indicates that the energy storage system 101 is charging, and a positive value indicates that the energy storage system 101 is discharging. The charging of the energy storage system 101 occurs when the net demand is less than the demand cap (see 375-377) as in the step 430 of FIG. 4, and in further detail as in steps 434-436 of FIG. 7.

In the example of FIG. 8, the net demand exceeds the summer peak demand cap starting at 16:00 hours and the storage system 101 discharges to maintain this demand level (positive values of the plot 354). 17:00 hours marks the end of the peak demand period and the start of the part-peak demand period, so the demand cap level resets to the part-peak value. Note that the method allows the energy storage system 101 to charge when net demand drops below the demand cap, extending the duration that the demand cap level can be maintained, effectively averaging the net demand during the afternoon part-peak demand period. At 18:15 hours, the dynamic demand cap reset causes an upward reset of the part-peak demand cap as the facility demand exceeds the previously predicted level. The off-peak demand period begins at 20:30 hours. An off-peak demand cap may also be imposed so that the recharge of the energy storage system 101 does not impact the off peak or all hours demand charge. In some cases, the energy storage system 101 may also discharge during the off-peak demand period to maintain the off-peak or all hours demand cap. Each tuned demand cap level parameters in different periods may be adjusted by modeling the photovoltaic system, energy storage system, and facility loads, and iteratively solving for the maximum achievable value. This may be performed on a regular basis (e.g. monthly) so that changing conditions can be better accommodated.

The above embodiments involve energy storage that is duration limited. In other embodiments where the energy storage is not duration limited, as in the case of a microturbine fueled by natural gas provided by the utility, there may be other constraints, such as fuel and operation and maintenance costs that would require optimization, but duration would not be a constraint. Nevertheless, establishing a predicted demand, dynamically resetting that demand, and determining the optimum dispatch level in each demand period as described herein are directly applicable to energy storage that is not duration limited.

Methods and apparatus for dispatching electrical energy from energy storage systems have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of dispatching electrical energy from an energy storage system, the method comprising:
    monitoring an electrical energy demand of a facility load of a facility that is coupled to a utility grid, the facility including an energy storage system;
    setting a demand cap for a demand period, the demand period corresponding to a time period over which a differential billing rate is applied by the utility grid against the facility;
    comparing the electrical energy demand of the facility load against the demand cap during the demand period;
    in response to determining that the electrical energy demand of the facility load is expected to be less than the demand cap, determining whether the energy storage system can dispatch electrical energy at a discharge limit of the energy storage system for a duration equal to or longer than a time remaining in the demand period; and
    in response to determining that the energy storage system can dispatch electrical energy at the discharge limit for the duration equal to or longer than the remaining time in the demand period, discharging electrical energy from the energy storage system at the discharge limit.

2. The method of claim 1 further comprising:
    in response to determining that the electrical energy demand of the facility load is expected to be greater than the demand cap, discharging electrical energy from the energy storage system based on the demand cap.

3. The method of claim 2 wherein the energy storage system discharges electrical energy equal to a difference between a level of the electrical energy demand of the facility load and a level of the demand cap when the electrical energy demand of the facility load is expected to be greater than the demand cap.

4. The method of claim 1 wherein the energy storage system comprises a battery.

5. The method of claim 4 wherein the discharge limit is at 100% power rating of the battery.

6. The method of claim 1 further comprising:
    dynamically adjusting the demand cap when the electrical energy demand of the facility load exceeds the maximum expected demand.

7. A power generation system of a facility that is coupled to a utility grid, the power generation system comprising:
    an energy storage system;
    a photovoltaic system coupled to provide electrical energy to a facility load of the facility; and
    a control system configured to control discharge of electrical energy from the energy storage system to the facility load, the control system being configured to monitor demand of the facility load for electrical energy, to compare the demand of the facility load against a demand cap for a demand period that corresponds to a time period over which a differential billing rate is applied by the utility grid against the facility, and to discharge electrical energy from the energy storage system at a discharge limit of the energy storage system when the demand of the facility load for electrical energy is expected to be less than the demand cap and the energy storage system can dispatch electrical energy at the discharge limit for a duration equal to or longer than a time remaining in the demand period.

8. The power generation system of claim 7 wherein the energy storage system comprises a battery.

9. The power generation system of claim 7 wherein the control system is configured to adjust the demand cap when the demand of the facility load is greater than a maximum expected demand.

10. The power generation system of claim 9 wherein the control system dynamically increases the demand cap.

11. The power generation system of claim 7 wherein the energy storage system is charged with electrical energy from the utility grid when the demand of the facility load is less than the demand cap.

* * * * *